March 27, 1962 M. T. THORSSON 3,027,080
ELECTRICAL TRANSLATING CIRCUITS
Filed Nov. 25, 1957
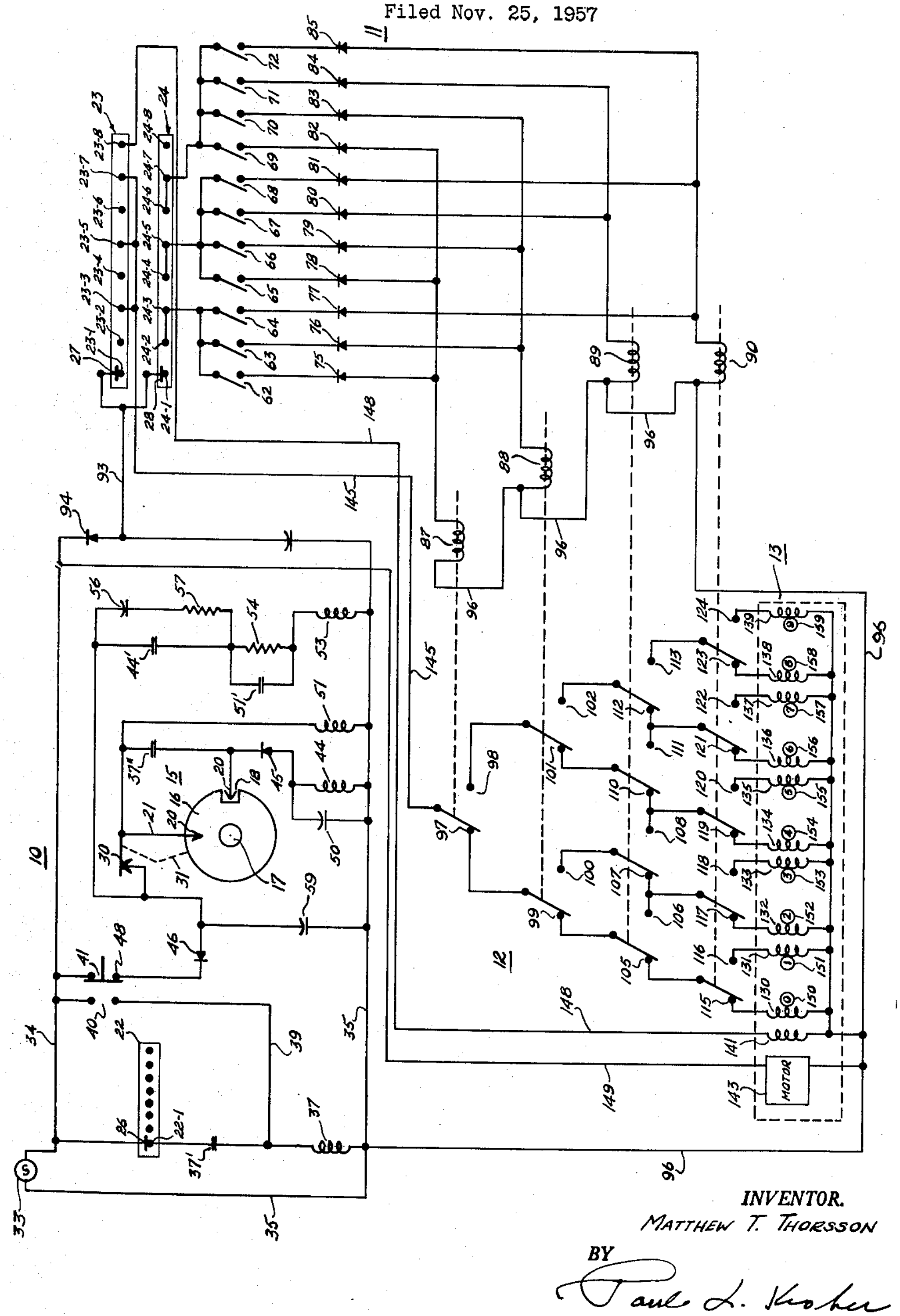
INVENTOR.
MATTHEW T. THORSSON
BY
Paul L. Kohler 3,027,080

ELECTRICAL TRANSLATING CIRCUITS

Matthew T. Thorsson, Moline, Ill., assignor to Fairbanks, Morse & Co., Chicago, Ill., a corporation of Illinois Filed Nov. 25, 1957, Ser. No. 698,600
5 Claims. (Cl. 235—155)

This invention relates to electrical translating circuits and more particularly to an electrical circuit for translating digital information from a non-decimal numerical system into a decimal numerical system.

The decimal system of numbers, wherein the digits from 0 to 9 are used in various denominational columns which are related to each other in factors of ten, is well known. The arithmetical processes of addition, subtraction, multiplication and division are easily performed with the decimal system. However, these arithmetical processes are not as easily accomplished in non-decimal numerical systems. Particularly, in the binary system of numbers or modifications thereof, difficulty is often encountered in performing these simple arithmetical processes.

On the other hand, certain commercial situations arise, particularly in the field of weighing, wherein a binary system of numbers or a modified binary system of numbers is especially useful. For specific instances of these situations, attention is directed to the following copending applications, the disclosures of which are hereby incorporated as if fully set forth herein: Serial No. 529,527, now Patent No. 2,819,054, for Binary Weighing System by Matthew T. Thorsson, filed on August 19, 1955; Serial No. 534,134 for Card Operated Batcher by Louis J. Lauler and Matthew T. Thorsson, filed on September 13, 1955; and Serial No. 544,169 for Electrical Batching System by Louis J. Lauler and Matthew T. Thorsson, filed on November 1, 1955. Each of these applications has been assigned to the assignee of the present application.

In these copending applications certain numerical information is useful in binary or modified binary form to control or effect operation of the weighing process. However, the reading of the weight information presents difficulties in converting the non-decimal information to decimal form.

It is an object of the present invention to provide a new and novel translating circuit for converting non-decimal information into decimal form.

It is another object of the present invention to provide a new and improved translating circuit which is simple in operation and economical to manufacture.

It is yet another object of the present invention to provide a novel translating circuit which is flexible for converting binary or modified binary numerical data into decimal form.

With the foregoing, and other objects in view, the invention is disclosed in the following specification and appended claims, one embodiment of which is shown in the accompanying drawing which shows schematically the electrical circuit of the invention.

Referring more particularly to the single figure of the drawing, there is therein illustrated a switching circuit 10, a numeral selector circuit 11, a coding matrix 12 and a printing control circuit 13. In general, binary information is manually set into selector circuit 11. The switching circuit 10 is then energized and electrical circuits are established over successive portions of selector circuit 11 to establish successive circuits over matrix 12 to certain of the printing coils of printing control circuit 13. Printing control circuit 13 effects operation of a printing calculator (not shown) to print a permanent record in decimal form, of the information manually preset in numeral selector circuit 11. While for convenience of explanation, the means for introducing the non-decimal digital information are shown as manual keys, it should be understood that in many applications, particularly in the weighing field, the non-decimal information will be inserted automatically by means of relay contacts or other non-manual means.

Referring more specifically to switching circuit 10, there is shown a switch 15 which is a stepping switch of the type used in conventional step-by-step advancing circuits. This switch is commercially available under the trademark "Ledex," and is manufactured by G. H. Leland, Inc. of Dayton, Ohio. The switch 15 comprises a round metallic conductive plate 16 which is connected to a shaft 17 and is rotatable therewith. Plate 16 has a slot 18 cut in its periphery. Slot 18 is arranged to receive a wiper 20 which is electrically isolated from plate 16 when it rests in slot 18 but completes electrical contact with plate 16 in all other positions of the plate. The wiper 20 has cam surfaces which enable it to emerge from slot 18 upon rotation of disc 16. A second wiper 21 makes electrical contact with plate 16 at all times. Plate 16 rotates in steps to complete one revolution before wiper 20 rests in slot 18, preparatory to a subsequent revolution of plate 16. The driving mechanism of disc 16 will be hereinafter described. Switch 15 further has a plurality of wafers 22, 23 and 24 positioned in spaced co-axial arrangement transverse to shaft 17. Wafers 22–24 are fixed in position and do not rotate. Each of the wafers is a disc of insulating material circular in form, having eight contacts spaced at equal intervals one from another, immediately inside its periphery. For convenience of explanation, the contacts for each wafer are shown in a straight line although they are, in fact, in a circular pattern near the outer edge of their associated wafer. The contacts are numbered 1 through 8 and have as a prefix the number of the wafer on which they appear. Thus, contact 1 of wafer 22 is designated 22—1. The same scheme is followed for the other contacts of each of the wafers.

Each of wafers 22–24 has a wiper 26, 27 and 28 associated therewith respectively. Wipers 26–28 are connected to shaft 17 and rotate therewith to contact in sequence, the contacts 1 to 8 of their respective wafers. Switch 15 further has a contact 30 which is opened and closed by action of a cam operator (indicated by the dotted line 31). Cam operator 31 is connected to shaft 17 so as to open contact 30 once for each step, or eight times for each revolution of plate 16. The mechanical arrangement of cam operator 31 is conventional and is not illustrated in detail.

Since switch 15 has been fully described, the remainder of the circuitry of switching circuit 10 follows. A source of alternating current 33, which may be the conventional 110 v. A.C. supply, is connected to bus lines 34 and 35. A start solenoid 37 is connected to source 33 over conductor 35, and over its holding contact 37', wiper 26 and contact 22—1 of wafer 22, and conductor 34. An alternate path for initial energization of start solenoid 37 extends from voltage source 33, over conductor 35, the winding of solenoid 37, conductor 39, the normally open contacts 40 of start switch 41, and over conductor 34 to source 33.

A switch control coil 44 is connected to source 33 over a circuit extending from source 33 over conductor 35, the winding of coil 44, a rectifier 45, the normally open contact 37'' of start solenoid 37, contacts 30 of switch 15, rectifier 46, the normally closed contacts 48 of manual start switch 41, and conductor 34 to source 33. A condenser 50 is connected in parallel with coil 44 to control the decay time of the de-energization of coil 44.

A current control switch coil 51 is connected in parallel with that portion of the energizing circuit for coil 44 comprising the series connection of contacts 37″, rectifier 45 and the winding of coil 44.

The operating coil 53 for switch 15 is energized over a circuit extending from source 33 over conductor 34, contacts 48 of start switch 41, rectifier 46, contacts 44′ of switch coil 44, resistor 54, the winding of coil 53 and conductor 35 to source 33. The contacts 51′ of current control coil 51 are shunted across current limiting resistor 54. To prevent excessive arcing across contacts 44′ when current applied to operating coil 53 is interrupted, a spark suppression circuit comprising the series combination of a condenser 56 and a resistor 57, is placed in parallel with these contacts.

To suppress ripple components in the direct current flowing through rectifier 46, a condenser 59 is connected from the junction of rectifier 46 and contacts 30 to conductor 35.

Referring now more particularly to the selector circuit 11, there is therein shown a plurality of manually operable switches or keys 62–72 which enable insertion of digital information as expressed in a non-decimal numerical system, into the translating circuit in a manner to be described hereinafter. Each of the manually operable keys has connected in series therewith one of the rectifiers 75–85. For convenience of explanation, the manually operable switches 62–72 may be considered as being formed into three groups: the first group is composed of switches 62–64; the second group, switches 65–68, and the third group, switches 69–72. Four relay coils 87–90 are connected in parallel and are associated with the groups in such a manner that a selected relay coil is energizable by no more than one manual key in each group. Furthermore, each key in each group is in series with only one of the relays.

The energizing path for each of the relays 87–90 is completed over the key or keys in series therewith and two of the contacts 24—2 to 24—7 of wafer 24, it being noted that contacts 24—2 and 24—3, 24—4 and 24—5, and 24—6 and 24—7 are in connected pairs. Contacts 24—1 and 24—8 of wafer 24 are not connected in the circuit.

The direct current energizing paths for the relays 87–90 has a common portion extending from wiper 28 over conductor 93, rectifier 94, conductor 34, source 33, conductor 35 and conductor 96. The specific portion of the energizing paths completed by the keys 62–72 for the relays 87–90 may be expressed in chart form as follows:

*Chart I*

| From Contact | Over Key | Over Rectifier | To Relay Coil |
|---|---|---|---|
| 24-2 | 62 | 75 | 87 |
| 24-2 | 63 | 76 | 88 |
| 24-2 | 64 | 77 | 90 |
| 24-4 | 65 | 78 | 87 |
| 24-4 | 66 | 79 | 88 |
| 24-4 | 67 | 80 | 89 |
| 24-4 | 68 | 81 | 90 |
| 24-6 | 69 | 82 | 87 |
| 24-6 | 70 | 83 | 88 |
| 24-6 | 71 | 84 | 89 |
| 24-6 | 72 | 85 | 90 |

Since the circuits over contacts 24—3, 24—5 and 24—7 to relays 87–90 are merely holding circuits for these relays, their paths are the same as those set forth in the above table for their associated contacts 24—2, 24—4 and 24—6, respectively.

The function of wafer 23 of switch 15, with its wiper 27 and contacts 23—1 to 23—8, is to provide energizing current for the operating coils of printing control circuit 13 through coding matrix 12, and this wafer will be considered as an adjunct of these two circuits.

Referring more specifically to coding matrix 12, there is therein shown a contact tree comprised of the contacts of relays 87–90. For convenience of describing the contacts associated with each of these relays, reference may be had to the following chart:

*Chart II*

| Relay | Non-Operated | Operated | Contacts | |
|---|---|---|---|---|
| | | | Made | Open |
| 87 | X | | 97 | 98 |
| | | X | 98 | 97 |
| 88 | X | | 99, 101 | 100, 102 |
| | | X | 100, 102 | 99, 101 |
| 89 | X | | 105, 107, 110, 112 | 106, 108, 111, 113 |
| | | X | 106, 108, 111, 113 | 105, 107, 110, 112 |
| 90 | X | | 115, 117, 119, 121, 123 | 116, 118, 120, 122, 124 |
| | | X | 116, 118, 120, 122, 124 | 115, 117, 119, 121, 123 |

The operation of certain selected ones of the relays 87–90 creates an energizing path for an appropriate one of the operating coils 130–139 of printing control circuit 13. Printing control circuit 13 is a part of a conventional adding machine which accumulates digits and prints them on a tape, card or other record material. Such adding machines are commercially available, such as, Model 1900 manufactured and sold by the Clary Corporation of Chicago, Illinois, and the internal mechanism thereof does not form a part of the present invention. However, the operation of such a machine will be briefly described to complete the present disclosure.

In the type of adding machine here used, there is a group of solenoids each of which receives one of the digits 0–9. To accumulate a given digit it is necessary only to energize that solenoid associated with that digit. In the present case the solenoids 130–139 correspond to the digits 0–9, respectively.

Referring now to wafer 23 and wiper 27, the energizing circuit for the solenoid 130, the "0" solenoid, may be traced from source 33 over conductor 34, rectifier 94, conductor 93, one of the contacts 23—3, 23—5 or 23—7, conductor 145, contacts 97, contacts 99, contacts 105, contacts 115, solenoid 130, conductor 96 and conductor 35 to source 33. Similar paths for each of the other solenoids 131–139 may be traced over the appropriate contacts of coding matrix 12. Thus, it may be seen that selected ones of relays 87–90, under the control of the keys 62–72, establish circuits for the introduction of desired digits into the adding machine.

As the appropriate one of the solenoids 130–139 is energized, the adding machine accumulates the digit of the highest denomination. Other digits in descending denominational order are then accumulated in the adding machine. After the last digit is introduced, a print coil 141 is energized to clutch in the shaft of print motor 143 which then causes printing of the full number. A specific example of the operation of the adding machine in accumulating and printing numbers will be given hereinafter.

The energizing circuit for print solenoid 141 extends from source 33 over conductor 34, rectifier 94, conductor 93, wiper 27 and contact 23—8 of switch 15, conductor 148, solenoid 141, conductor 96, and conductor 35 to source 33.

The energizing circuit for motor 143 which may be a synchronous motor, extends from source 33 over conductor 34, conductor 149, motor 143, conductor 96 and conductor 35 to source 33. Thus, motor 143 is continuously in operation.

The present invention concerns the translation of a number from a modified binary system to the decimal system. The modified binary system herein contemplated may be characterized as a modified binary-decimal system wherein each digit of a decimal number is expressed in modified binary form. The modified binary form utilizes the digits 4—2—2—1, rather than the straight binary notation 8—4—2—1, in order to prevent the difficulties encountered with carry over of digits from one denomination to another.

Before explaining the complete operation of the translating circuit, the function of keys 62–72 will be considered. As previously discussed, the keys may be considered in terms of three groups. The first group (keys 62–64) are used in combination to designate the numeral of the highest denomination. The second group (keys 65–68) are used in combination to designate the numeral of the next highest combination. The third group (keys 69–72) are used to designate the numeral of the lowest denomination. As herein shown only a number having a maximum of three digits may be set into the translating device. Additional groups of keys may be added, as desired, to accommodate numbers having more than three digits.

Specifically, if the number "8" is desired as the units digit (the lowest denomination), the keys 69, 70, and 71 are closed, corresponding to the digits "4," "2," and "2" respectively of the modified binary system. If the decimal number 652 is desired, the keys 62 and 63 of the first group, keys 65 and 68 of the second group and key 71 of the third group are closed. The closure of the keys of a single group prepares energizing circuits for their associated ones of the relays 87–90 to set up the contacts in the contact tree so that the appropriate one of the coils 130–139 may be later energized. The individual coils 130–139 are sequentially prepared for energization in accordance with the energization of the relays 87–90, as these latter relays are operated by the groups of keys in sequence.

It should be noted that only three keys are shown in the first group (keys 62–64). This means that a number higher than 799 cannot be set into the device, as shown. However, if desired another key connected in series with relay 89 could be inserted in the circuit, and then numbers to 999 could be set into the translating device.

Before a specific example of the translation of a number from the modified binary-decimal system to the decimal system is considered, the operation of stepping switch 15 will be explained.

To begin operation of switch 15, start switch 41 is pressed to close contacts 40. Closure of contacts 40 completes an energizing circuit for start solenoid 37 extending from source 33 over conductor 34, contacts 40, conductor 39, solenoid 37, and conductor 35 to source 33. Energization of solenoid 37 causes closure of contacts 37′ and 37″. Closure of contacts 37′ completes a holding circuit for solenoid 37 extending from source 33 over conductor 34, wiper 26 and contacts 22—1 of wafer 22, contacts 37′, solenoid 37 and conductor 35 to source 33. Contacts 37″ close and prepare an energizing circuit for switch control coil 44 extending from source 33 over conductor 34, the yet open contacts 48 of start switch 41, rectifier 46, contacts 30, contacts 37″, rectifier 45, coil 44 and conductor 35 to source 33. At this time manual start switch 41 is released and contacts 48 are closed to complete the above described energizing circuit for switch control coil 44. Upon closure of contacts 48, an energizing circuit for current control coil 51 is completed from source 33 over conductor 34, contacts 48, rectifier 46, contacts 30, coil 51 and conductor 35 to source 33. Control coil 51 operates and closes contacts 51′ to short out resistor 54.

Switch control coil 44 operates and closes contacts 44′ to complete an energizing circuit for operating coil 53, the circuit extending from source 33 over conductor 34, contacts 48, rectifier 46, contacts 44′, contacts 51′, coil 53 and conductor 35 to source 33.

Coil 53 operates and causes disc 16 of switch 15 to rotate. Rotation of disc 16 moves wiper 20 out of slot 18 and creates an electrical circuit from wiper 21 to wiper 20, bypassing contacts 37″. This shunting circuit is maintained until disc 16 rotates 360° to again permit wiper 20 to enter slot 18. As the disc 16 rotates one-eighth of a circle, or 45°, the cam follower 31 causes contacts 30 to open and interrupt the energizing circuits for coils 44 and 51. De-energization of coils 44 and 45 releases contacts 44′ and 51′.

The opening of contacts 51′ re-inserts current limiting resistor 54 into the circuit with switch actuating coil 53 to prevent burnout thereof.

Opening of contacts 44′ interrupts the energizing circuit for switch coil 53 and stops rotation of disc 16 after a turn of 45°. The movement of disc 16 which is connected to shaft 17, causes stepping of wipers 26, 27 and 28 from contact 1 of each wafer to contact 2. For example, wiper 26 moves from contact 22—1 to 22—2. Since wipers 20 and 21 are shortened by disc 16, the contacts 22—2 to 22—8 of wafer 22 are not needed in the circuit, and so are ineffectual.

After the cam (not shown) in switch 15 has passed its center point, a spring (not shown) recloses contacts 30. Reclosure of contacts 30 completes the energizing circuits for coils 44 and 51. Coils 44 and 51 operate to re-energize coil 53 and cause switch 15 to step its wipers 26, 27 and 28 to the #3 contacts of their respective wafers. The stepping action continues until wiper 20 re-enters slot 18 to stop the stepping action. The switch 15 is now ready for reoperation by operation of manual start switch 41, it being noted that the wipers 26, 27 and 28 are then on the #1 contacts of their respective wafers.

Referring now to numeral selector circuit 11, there is set therein the modified binary-decimal number which is to be translated into the decimal system. Thus, assume the modified binary-decimal number is set into the three key groups as follows: the numeral 4 in the first group, numerals 4, 2 and 1 in the second group and numerals 4 and 2 in the third group. This numeral will be translated into 476 in the decimal notation.

To set this number in terms of the modified binary decimal system, into the numeral selector circuit 11, key 62 of the first group, keys 65, 66 and 68 of the second group and keys 69 and 70 of the third group are manually closed.

The switching circuit 10 is set into operation in the manner hereinbefore described, by depressing manual start switch 41. Switch 15 begins its stepping action and as wiper 28 reaches contact 24—2 of wafer 24, there is an energizing circuit established for relay coil 87, which energizing circuit extends from source 33 over conductor 34, rectifier 94, conductor 93, wiper 28 and contacts 24—2 of wafer 24, contacts 62, rectifier 75, the operating coil of relay 87, conductor 96, and conductor 35 to source 33. Relay 87 operates and prepares an energizing circuit for printer coil 134 (the #4 printer solenoid) extending from source 33 over conductor 34, rectifier 94, conductor 93, wiper 27 and contacts 23—3 of wafer 23, conductor 145, contacts 98, 101, 110, 119, conductor 96 and conductor 35 to source 33.

After a short interval switch 15 steps to its next position and carries wipers 27 and 28 to contacts 23—3 and 24—3 of wafers 23 and 24 respectively.

The circuit over wiper 28 and contacts 24—3 is in parallel with that over wiper 28 and contacts 24—2 to form a holding circuit for relay 87. The energizing circuit for printer coil 134 is completed by the advance of wiper 27 to contacts 23—3. Printer coil 134 operates and inserts the numeral 4 into the adding machine.

Switch 15 steps to its next position and moves wipers 27 and 28 to contacts 23—4 and 24—4 respectively. As wipers 27 and 28 leave contacts 23—3 and 24—3 respectively, the energizing circuits for relay 87 and coil 134 are interrupted and these coils are restored to their unoperated condition.

The advance of wiper 28 to contacts 24—4 completes energizing paths for relay coils 87, 88 and 90. To avoid tedious repetition, the portion of the circuit from and including conductor 96, conductor 35, source 33, conductor 34, rectifier 94 and conductor 93 will be hereinafter designated as A.

Energizing circuits for relays 87, 88 and 90 are completed as follows:

| Relay: | Circuit |
|---|---|
| 87 | A, over wiper 28, contacts 24—4, key 65, rectifier 78, and the coil of relay 87. |
| 88 | A, over wiper 28, contacts 24—4, key 66, rectifier 79, and the coil of relay 88. |
| 90 | A, over wiper 28, contacts 24—4, key 68, rectifier 81, and the coil of relay 90. |

Relays 87, 88 and 90 operate and as may be seen by reference to chart II, an energizing path is prepared for coil 137 as follows: circuit A, over wiper 27, contacts 23—5, conductor 145, contacts 98, contacts 102, contacts 112, contacts 122 and relay coil 137.

As switch 15 steps wiper 27 to close contacts 23—5, the energizing path for relay 137 is completed, and the numeral 7 is set into the adding machine. At the same time wiper 28 is advanced to complete the holding circuit for relays 87, 88 and 90 over contacts 24—5.

Since previously, the number 4 was set into the adding machine 13, the number 4 is now set up in the next higher denominational column. Thus, if at this point, the printer were actuated, the number 47 would be printed. However, since in our example the number 476 has been chosen, the switch 15 continues its stepping action and wipers 27 and 28 advance to contacts 23—6 and 24—6 respectively.

As wipers 27 and 28 leave contacts 23—5 and 24—5 respectively, the energizing circuits for relays 87, 88 and 90 and printing coil 137 are interrupted and relays 87, 88 and 90 restore to their unoperated condition.

As wiper 28 reaches contacts 24—6, it completes an energizing circuit for relays 87 and 88 as follows:

| Relay: | Circuit |
|---|---|
| 87 | A, over wiper 27, contacts 24—6, key 69, rectifier 82, and the coil of relay 87. |
| 88 | A, over wiper 27, contacts 24—6, key 70, rectifier 83, and the coil of relay 88. |

Relays 87 and 88 operate and prepare an energizing path for printer coil 136 as follows: circuit A, wiper 27, contacts 23—7, conductor 145, contacts 98, contacts 102, contacts 112, contacts 121, and the coil of printing solenoid 136.

Switch 15 steps wipers 27 and 28 to contacts 23—7 and 24—7 respectively to complete a holding circuit for relays 87 and 88 and the energizing circuit for printer coil 136. Energization of printer coil 136 sets the number 6 into the adding machine and moves the digits 4 and 7 each to the next higher denominational orders respectively.

Thus, the decimal number 476 is now set up in the adding machine.

Switch 15 steps wipers 27 and 28 to meet contacts 23—8 and 24—8 respectively. As wipers 27 and 28 leave contacts 23—7 and 24—7, the energizing circuits for coils 87 and 88 of numeral selector circuit 11 and for printer coil 136 are interrupted, and these coils are restored to their unoperated condition.

As wiper 27 mates with contacts 23—8, an energizing circuit for printer clutch coil 141 is completed over circuit A, wiper 27, contacts 23—8, conductor 148, and the printer clutch coil 141. The adding machine then prints the decimal number 476 as accumulated therein, on a permanent record.

Switch 15 steps to its next position and moves wipers 26, 27 and 28 to contacts 22—1, 23—1 and 24—1 respectively. At this time wiper 20 re-enters slot 18 and further stepping action of switch 15 is prevented until again manual start switch 41 is operated.

As wiper 27 moves from contacts 23—8, the energizing circuit for clutch coil 141 is thereby interrupted and coil 141 restores to its unoperated condition.

There has been heretofore described one embodiment of the present invention which effectively translates a non-decimal number into a decimal number by using a novel translating circuit.

The circuit herein described may be used as an adjunct to a conventional adding machine and does not supersede its use as a conventional device. For this reason, adding machine keys 150–159 are shown. The mechanical arrangement of these keys is not altered by the invention except that solenoid coils 130–139 are placed around the shafts of these keys respectively to enable them to be operated electrically by the translating circuit.

Thus, if other information of a decimal nature be inserted manually into the adding machine, by means of these keys, the function of the translating circuit would not be impaired.

There are times when it may be desirable to differentiate separate weighing operations by designating numbers. In such cases, the serial numbers for each load or other data may be manually set into the adding machine by means of keys 150–159 and printed on the tape. Subsequently the weight of each load can be printed through the translating circuit.

While a specific embodiment of the present invention is herein shown and described, other modifications, changes and re-arrangements may be made by those skilled in the art without exceeding the scope of the appended claims.

I claim:

1. An electrical circuit for translating digital information from a non-decimal numerical system into a decimal numerical system comprising, a plurality of groups of circuit completing elements, said circuit completing elements for each group being settable to a number in a non-decimal system, said groups of elements being arranged in decimal denominational order with each of said groups of elements corresponding to a selected denominational order, a group of path selecting relays, each relay of said group being connected to be controlled by preselected ones of said elements, a plurality of relays for producing the decimal system equivalent of said non-decimal number, a contact network operable by said path selecting relays and connected to said producing relays for energizing those relays selected thereover, means for periodically applying an energizing voltage through said contact network to energize a selected one of said producing relays, and means adapted to sequentially apply an energizing voltage through said circuit completing elements to selected ones of said path selecting relays.

2. An electrical circuit for translating digital information from a non-decimal numerical system into a decimal numerical system comprising, a plurality of groups of circuit completing elements, said circuit completing elements for each group being settable to a number in a non-decimal system, said groups of elements being arranged in decimal denominational order with each of said groups of elements corresponding to a selected denominational order, a group of path selecting relays, each relay of said group being connected to be controlled by preselected ones of said elements, a plurality of relays for producing the decimal system equivalent of said non-decimal number, a contact network operable by said path selecting relays and connected to said producing relays for energizing those relays selected thereover, means for periodically applying an energizing voltage through said contact network to energize a selected one of said producing relays, means adapted to sequentially apply an energizing voltage through said circuit completing elements to selected ones of said path selecting relays, and means for recording the decimal number translated by said producing relays.

3. Translator means for converting digital information in terms of a non-decimal number system to equivalent decimal system numbers, comprising decimal system digit setting means including elements individual to the digits zero through nine, operable to set the digits for recording or the like, control means selectively operable to condition any one of said elements for operation, means effective in accordance with digital information in terms of a non-decimal number system for conditioning said control means for operation, and cyclically operating means for alternately causing operation of those of said control means selected by said conditioning means and causing operation of the element conditioned for operation by said control means.

4. Means for translating digital information in terms of a non-decimal system to equivalent decimal system numbers and recording the numbers, comprising mechanism effective for recording decimal system numbers, said mechanism including digit setting electrical coil elements, an energizing circuit for said coil elements including control switches selectively settable to connect certain of the coil elements in the energizing circuit and stepping switch means controlling the energizing circuit to effect sequential energization of the certain coil elements connected in the energizing circuit, electrical operating means for said control switches, and circuit means including normally open selectively closable switch elements for connecting said operating means selectively to said energizing circuit, closure of said switch elements being effected selectively according to given digital information in terms of a non-decimal system.

5. Translator means for converting digital information in terms of a non-decimal number system to equivalent decimal system numbers, comprising decimal system digit setting means including elements individual to the digits zero through nine, operable to set the digits for recording or the like, control means selectively operable to condition any one of said elements for operation, said control means including a plurality of relay coils and contacts respectively associated with said relays, means including groups of selectively settable switches, each of said switches of each group being connected to a respective one of said relays for completing an energizing circuit thereto, and each of said groups of switches being settable in a non-decimal number system to represent a digit in one denominational order of a decimal system and cyclically operating means for alternately causing operation of said control means and causing operation of said conditioned element and for sequentially completing energizing paths to said elements over individual ones of said groups of switches in descending denominational order.

References Cited in the file of this patent

UNITED STATES PATENTS

| | | |
|---|---|---|
| 2,401,621 | Desch et al. | June 4, 1946 |
| 2,528,394 | Sharpless et al. | Oct. 31, 1950 |
| 2,620,974 | Valtat | Dec. 9, 1952 |
| 2,741,427 | Drake | Apr. 10, 1956 |
| 2,813,676 | Boyer et al. | Nov. 19, 1957 |
| 2,822,982 | Faulkner | Feb. 11, 1958 |
| 2,855,584 | McCarroll et al. | Oct. 7, 1958 |